July 14, 1970    L. C. BLANDING ET AL    3,520,197
DYNAMIC SUPPORT ACCELEROMETER
Filed May 16, 1966

INVENTORS
LEONARD C. BLANDING
THEODORE R. CARINO
LYLE F. WARNOCK, JR.

BY

ATTORNEYS

July 14, 1970     L. C. BLANDING ET AL     3,520,197
DYNAMIC SUPPORT ACCELEROMETER Filed May 16, 1966     4 Sheets-Sheet 2

INVENTORS
LEONARD C. BLANDING
THEODORE R. CARINO
BY   LYLE F. WARNOCK, JR.

*Price & Heneveld*

ATTORNEYS

INVENTORS
LEONARD C. BLANDING
THEODORE R. CARINO
LYLE F. WARNOCK, JR

BY *Price & Henneveld*

ATTORNEYS

INVENTORS
LEONARD C. BLANDING
THEODORE R. CARINO
LYLE F. WARNOCK, JR.

BY

ATTORNEYS 3,520,197
Patented July 14, 1970

1

3,520,197
DYNAMIC SUPPORT ACCELEROMETER
Leonard C. Blanding, Theodore R. Carino, and Lyle F. Warnock, Jr., Grand Rapids, Mich., assignors to Lear Siegler, Inc.
Filed May 16, 1966, Ser. No. 560,936
Int. Cl. G01p 15/08
U.S. Cl. 73—516                                       13 Claims

ABSTRACT OF THE DISCLOSURE

This invention relates to accelerometers wherein the proof mass is supported on a film of compressed gas. The gas film support is generated by vibrating piezoceramic benders which compress air or other gas between the support and the proof mass. This gas bearing markedly reduces the friction between the proof mass and the support allowing the proof mass to uniformly respond to external acceleration.

---

This invention relates to accelerometers and, more particularly, to an accelerometer adapted to measure accelerations by sensing the tendency for relative movement between a proof mass and a support structure upon which the proof mass is dynamically borne.

Broadly speaking, an accelerometer is a device adapted to measure the accelerations of an object or vehicle upon which it is placed with respect to some type of reference. In self-contained navigation systems, accelerometer devices generally comprise a casing affixed to the vehicle for movement therewith along at least one axis and a proof mass which is slidable along that axis under some type of resilient restraint. As the vehicle accelerates, the proof mass is displaced with respect to the casing in accordance with Newton's Second Law which provides that force is equal to mass times acceleration. Thus, the acceleration which the particular vehicle is undergoing may be determined by measuring the force on the resilient restraining means and dividing it by the mass of the proof mass.

Accelerometer devices are usually constructed and positioned within the vehicle such that they measure accelerations along only one or two of the three co-ordinate axes. Accelerations along these axes are isolated by the means with which the casing is affixed to the vehicle or by mechanical or electrical resolvers which are capable of resolving accelerations within a given plane into X and Y components. For example, in an aircraft an accelerometer might be mounted on the gyroscopic platform in such a manner that it was roll and pitch stabilized. Assuming the accelerometer to be capable of measuring accelerations along two axes, and assuming the vertical accuracy of the platform, the accelerometer would measure accelerations of the vehicle within a plane perpendicular to the earth's vertical. These accelerations might then be resolved into fore-aft and athwartship components for utilization in navigation, gyroscopic correction, radar control or any of a vast number of other systems.

It will be apparent that Newton's Second Law assumes the absence of frictional forces acting upon the proof mass during the period that it is moving under the influence of the vehicle's acceleration with respect to the reference casing. Any friction existing between the mass and the casing will introduce an error into the calculated acceleration of the vehicle. This error may be reduced by the introduction of correctional constants into the computing network. Such corrections, however, are hazy at best and equipment can be simplified and more accurate results obtained by reducing the friction between the proof mass and the casing to a minimum.

It is an object of this invention to provide an accelerometer which is capable of measuring vehicle accelerations with extreme accuracy.

More particularly, it is an object of this invention to provide an accelerometer wherein friction between the proof mass and the casing is reduced virtually to zero.

It is an object of this invention to provide a two-axis accelerometer which can be incorporated into a relatively small package and which is capable of measuring accelerations along both axes in any given plane.

It is an object of this invention to provide an accelerometer wherein relative displacements between the proof mass and the casing are minimized, thus markedly reducing the amount of clearance which must be provided within the casing for movement of the proof mass.

These and other objects of this invention will be clearly understood by reference to the following specification and accompanying figures in which.

Briefly, this invention comprises a two-axis accelerometer having a casing within which the proof mass is supported by means of vibrating piezoceramic benders which compress the air or other type of gas between the casing and the proof mass to provide an air bearing capable of supporting the proof mass. This air bearing markedly reduces the friction between the proof mass and the casing, allowing the proof mass to uniformly respond to external accelerations of the casing.

Means are provided for sensing deviations of the proof mass from its null position within the casing and for deriving a signal indicative of the casing's acceleration from these deviations. Preferably, this signal is derived by monitoring the current required to constantly rebalance the proof mass to its null position. The rebalancing network may consist of a permanent magnet having a number of air gaps which interact with balancing coils affixed to the proof mass. As deviations are sensed, appropriate signals are fed to these rebalancing coils which interact with the permanent magnetic fields to cause the proof mass to move back into its null position.

The means for sensing the deviations of the proof mass from its null position may comprise a series of resolver oriented capacitors, each having three plates. One of the plates, preferably the middle, is affixed to the proof mass for movement therewith. As the proof mass shifts with respect to the casing in response to external accelerations, the relative plate spacings of the resolver capacitors vary. Appropriate circuit means are provided for sensing these variations and for energizing the rebalance coils such as to move the proof mass back toward its null position.

Figure 1:
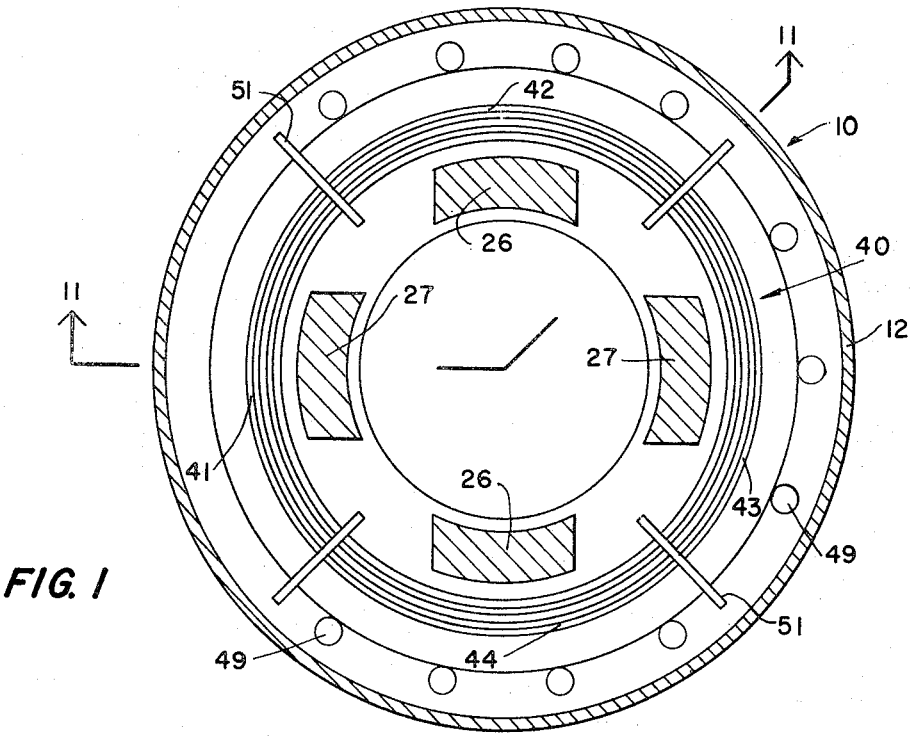
FIG. 1 is a cross-sectional view of an accelerometer fabricated in accordance with the teachings of this invention taken along line I—I of FIG. 2.
Figure 2:
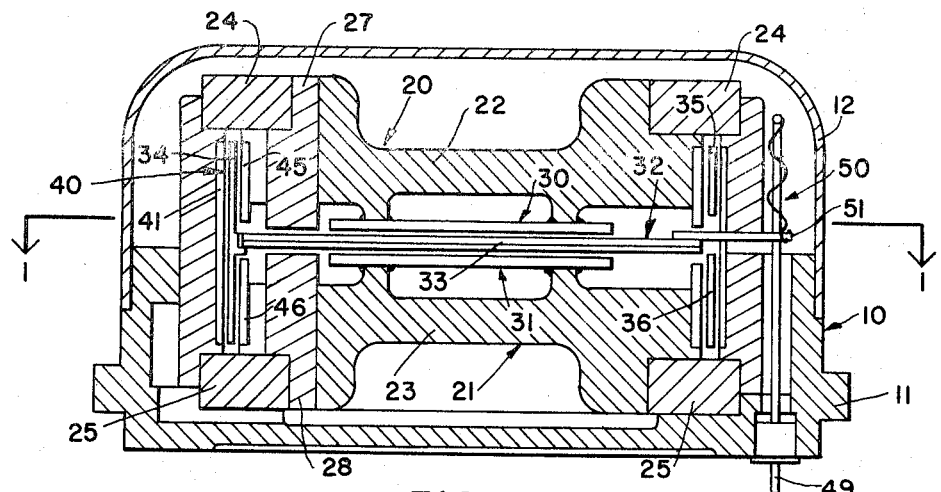
FIG. 2 is a cross-sectional view taken along line II—II of FIG. 1.
Figure 3:
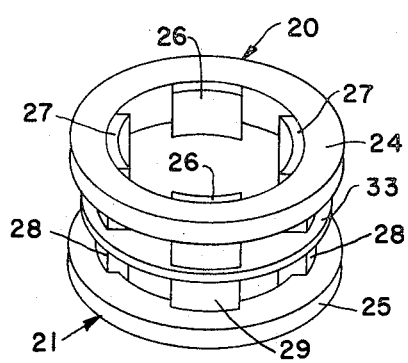
FIG. 3 is a perspective view of the accelerometer magnet configuration.

Referring now to the figures, a preferred embodiment of this invention, along with two modifications, will be described in detail. FIGS. 1 and 2 show an accelerometer having a casing 10 which consists of a base 11 and a suitable cap 12. Disposed within casing 10 are an upper magnetic assembly 20 and a lower magnetic assembly 21 (see FIG. 3). Upper magnetic assembly 20 consists of an upper magnet retainer 22 which has a cylindrical upper permanent magnet 24 disposed therearound. Extending downwardly from upper cylindrical magnet 24 are a series of four magnetic poles. Two of these poles are upper north poles 26 and two are upper south poles 27. Similarly, lower magnet retainer 23 has a cylindrical lower permanent magnet 25 disposed therearound having lower north poles 28 and lower south poles 29 extending upwardly therefrom. As is seen best in FIG. 3, upper magnet assembly 20 and lower magnet assembly 21 are disposed within casing 10 such that alternative north and south poles thereof face one another and such that an air gap is provided between facing poles. Thus, upper north poles 26 face lower south poles 29 while upper south poles 27 face lower north poles 28.

The circular upper vibrating or driver assembly 30 is affixed to upper magnet retainer 22 and a lower vibrating or driver assembly 31 is affixed to lower magnet retainer 23. Upper and lower vibrating assemblies 30 and 31 are piezoceramic benders which vibrate in response to applied oscillating signals. Each of the drivers or vibrators consists of an Invar disc with a PZT–five piezoelectric ceramic disc bonded to each face. These materials are ideally suitable for bonding because of their matched thermal co-efficience, thus insuring a flat driver surface throughout the entire temperature range. A suitable piezoceramic bender is available under the trade name Bimorph and is manufactured by the Clevite Corporation. The drivers are polled such that a mechanical oscillation of the disc is produced when the two outer surfaces are excited from an oscillating voltage source. The circular drivers are preferably mounted such that their nodal diameters make sole contact with magnet retainers 22 and 23. That is to say, that the drivers are connected to the retainers along points where the driving motion is zero.

The proof mass, indicated generally by the reference numeral 32, consists of a winding disc 33 disposed in perpendicular fashion within a generally cylindrical mass ring 34. Winding disc 33 divides mass ring 34 into an upper flange 35 and a lower flange 36. Suitable means are provided on the inner periphery of the mass ring for retaining the winding disc in this position. The core of the winding disc may conveniently be fabricated from aluminum or any of several other available types of non-magnetic structural materials. When a conductive material is chosen, eddy currents created within the disc by its movement in the flux field will contribute toward desirable system damping characteristics.

The pick-off assembly, indicated generally by the reference numeral 40, consists of a series of four outer plates 41, 42, 43 and 44 mounted to casing 10 as shown in FIGS. 1 and 2. Outer plates 41, 42, 43 and 44 form the resolving plates of a series of four 3-plate capacitors. The middle plate of each of the capacitors is formed by the upper and lower flanges of the cylindrical mass ring 34. The pick-off assembly is completed by an upper inner-plate 45 and a lower inner-plate 46 which are also affixed to the casing 10. Thus, it will be seen that the middle plate of the four resolver capacitors which comprise pick-off assembly 40 may move relative to the inner and outer plates as the casing is accelerated in any given direction in any given plane. That is to say, that the cylindrical nature of the mountings and pick-offs allows the accelerometer to sense acceleration along two axes. For a more detailed discussion of the capacitive pick-off assembly, reference is made to U.S. Pat. No. 3,435,317 issued Mar. 25, 1969, and assigned to the same assignee as the present application.

Figure 4:
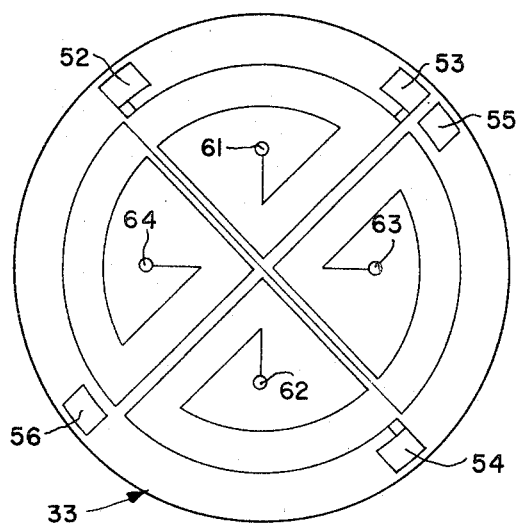
FIG. 4 is a schematic illustration of the forcer windings on one side of the proof mass.
Figure 5:
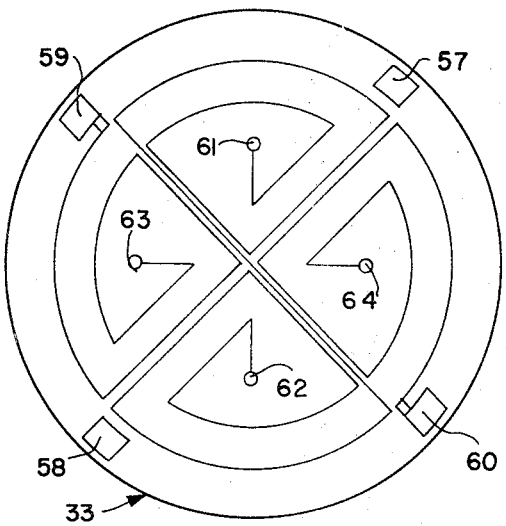
FIG. 5 is a schematic illustration of the forcer windings on the opposite side of the proof mass.
Figure 6:
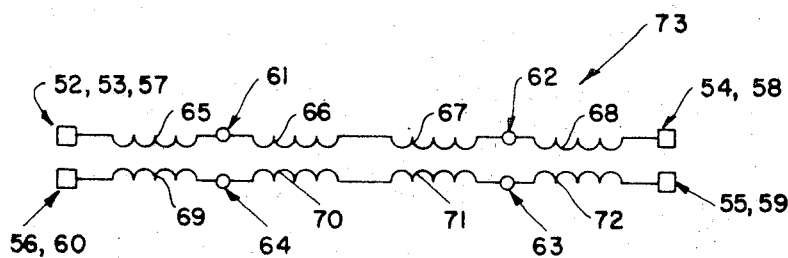
FIG. 6 is a schematic diagram of the X and Y forcer windings.

Referring now to FIGS. 4 through 6, the details of the X-axis and Y-axis forcer windings will be described. The windings are preferably formed on both sides of winding disc 33 by photo-etching techniques. These windings consist of a plurality of contacts 52 through 64 between which are disposed a plurality of windings 65 through 72. From the schematic illustration of FIG. 6, it will be seen that the X-axis forcer 73 consists of coils 65, 66, 67 and 68. These coils are disposed on opposite quadrants of the winding disc. Similarly, Y-axis forcer 74 consists of coils 69, 70, 71 and 72 disposed on the remaining quadrants of the winding disc. The terminal arrangements are well-known in the art and are believed to be apparent from an examination of FIGS. 4, 5 and 6. Therefore, they will not be discussed in detail. Suffice it to say that winding disc 33 is positioned within casing 10 such that the X-axis forcer windings are disposed in opposite air gaps of the magnetic circuits created by permanent magnets 24 and 25 and their associated poles while the Y-axis forcer windings are disposed within the remaining air gaps.

Electrical connections may be made to the proof mass for winding excitation by means of conventional flex leads 50. Each of the flex leads has a bridge 51 which extends through appropriate gaps between outer capacitor plates 41 through 44, through appropriate apertures in the surface of mass ring 34, and through the space between upper and lower segments, 45 and 46 respectively, of the inner capacitor plates to contact the proper terminals on winding disc 33. Suitable connections to the accelerometer may be made by terminals 49.

Figure 7:
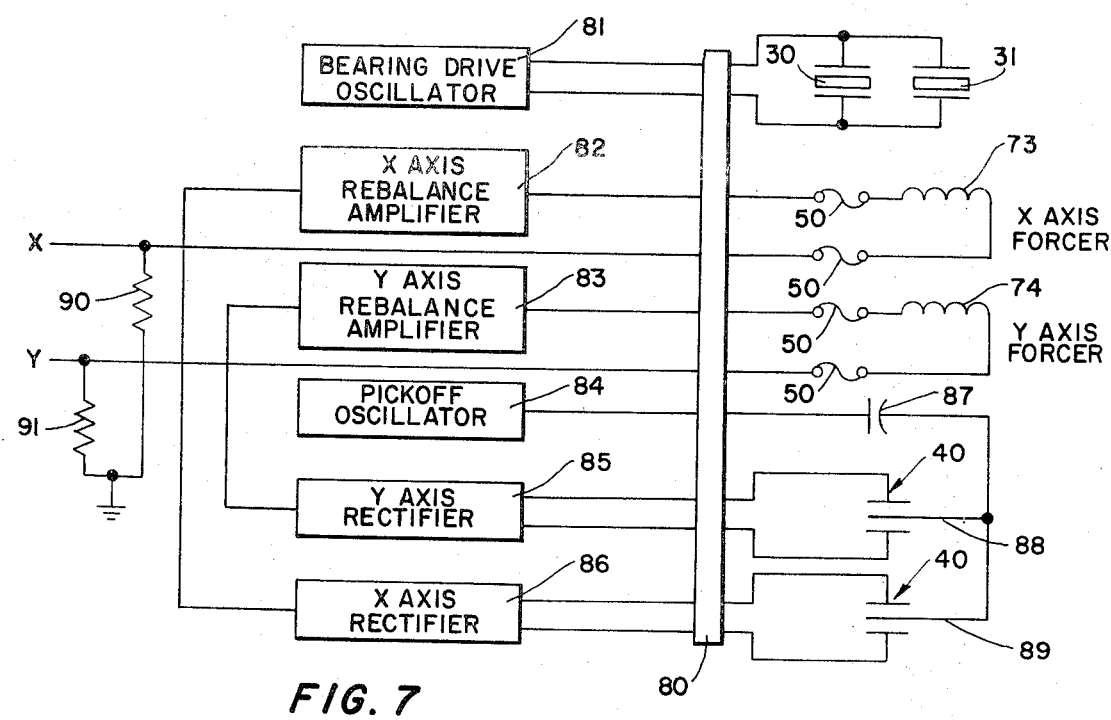
FIG. 7 is a block diagram of the electrical circuitry associated with and inter-connecting the accelerometer.

Appropriate hardware is provided for driving, sensing and resolving the various accelerometer components. As shown in FIG. 7, the hardware may comprise a header 80, a bearing drive oscillator 81, an X-axis rebalance amplifier 82, a Y-axis rebalance amplifier 83, a pick-off oscillator 84, a Y-axis rectifier 85, an X-axis rectifier 86, and a pair of sampling impedances 90 and 91.

OPERATION

In operation, bearing drive oscillator 81 is initially activated. Oscillator 81 is preferably of the self-compensating type. Resonant frequency tracking may be accomplished by driving the vibrators 30 and 31 with a stable voltage amplifier and feeding back a signal proportional to the current through the vibrating drivers. The feedback network is adjusted for oscillation at the desired frequency and it will thereafter inhibit resonance at undesired frequencies.

Drivers 30 and 31 effectively form a squeeze-film bearing between proof mass 32 and casing 10. The squeeze-film bearing derives its load support capability from the compression of gas between two surfaces in close proximity, one of which is oscillated normal to the other. At low frequencies, the gas acts as an incompressible fluid and exerts viscous forces upon the surfaces as it is squeezed in and out of the bearing gap. No steady-state lead support is achieved during this period. But, as the oscillation frequency is increased, viscous friction increases, and the gas becomes more and more compressible until such time as no tangential flow takes place and load support is achieved. A non-sinusoidal pressure distribution is generated within the gaps between winding disc 32 and the circular drivers 30 and 31. This distribution has a finite super-ambient average pressure which levitates the proof mass with respect to the casing.

When casing 10 experiences an acceleration, proof mass 32 will tend to lag behind it until such time as the restraining force on it equals its mass times the external acceleration. This restraining force is provided by the forcer windings on disc 33 co-acting with the permanent magnet forcers. Assume, for example, that the proof mass begins to displace in some direction with respect to casing 10. This will cause the upper and lower flanges 35 and 36 of mass ring 34 to vary the capacitance of the resolver capacitors 40. These capacitors are constantly excited by pick-off oscillator 84 which may be capacitively coupled at 87 to upper and lower flanges 35 and 36 of mass ring 34 (see FIG. 7). Any displacement of the mass ring 34 with respect to casing 10 is detected and resolved into X and Y components by the variance in capacitance of the pick-off capacitors 40. The signals from pick-off oscillator 84 are modified by these changes in capacitance and are routed to an X-axis rectifier 85' and Y-axis rectifier 86 from Y pick-off 88 and X pick-off 89. After the signals have been rectified, they are routed to the X-axis rebalance amplifier 82 and a Y-axis rebalance amplifier 83. The two DC rebalance amplifiers 82 and 83 are utilized to close the loops around the accelerometer through the permanent magnet forcer windings located on disc 33. The current required to rebalance the proof mass will be proportional to the acceleration tending to displace the proof mass. This current may be measured by the voltage drop across either or both of sampling impedances 90 and 91 which are connected from the low side of the forcer rebalance windings to ground. Thus, a ground reference signal is provided for both measuring axes of the device.

The photo-etching techniques which are used to affix the windings to the winding disc 33 allow a compact clover leaf winding pattern to be obtained with a density of approximately 333 lines per inch on both sides of a 0.010 inch thick aluminum disc. The dynamic range of the accelerometer may be expanded by adding additional winding substrates so as to add more turns within the various air gaps. The linearity of the forcer is optimized by shunting any existing fringe flux through the Invar discs of the drivers.

Regardless of the direction of the acceleration within a given plane, the attendant tendency toward displacement of the proof mass will be sensed and resolved into axial components and the force required to rebalance it monitored to give an indication of the acceleration. The utilization of vibrating drivers 30 and 31 to provide an air bearing for the proof mass absolutely minimizes any frictional errors which might otherwise be present within the system. The accelerometer has been designed such that the proof mass requires a minimum amount of clearance within which to operate, thus further reducing the possibility of random errors. The two-axis differential capacitor bridge circuit used to indicate the proof mass positional deviation from null is extremely accurate, thus adding to the reliability of the system. The two DC rebalance amplifiers used to close the loops around the accelerator through the permanent magnet forcer windings and the two sampling resistors may be located remotely to the accelerometer. The pick-off oscillator and pick-off rectifier circuitry should be mounted in close proximity to the accelerometer to reduce stray pickup effects.

ALTERNATIVE EMBODIMENTS

Figure 8:
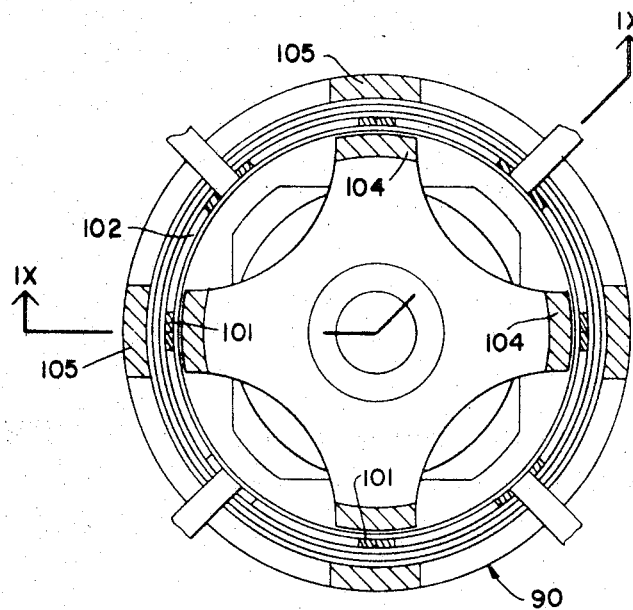
FIG. 8 is a fragmentary plan view, partially in cross-section, of a second embodiment of this invention.
Figure 9:
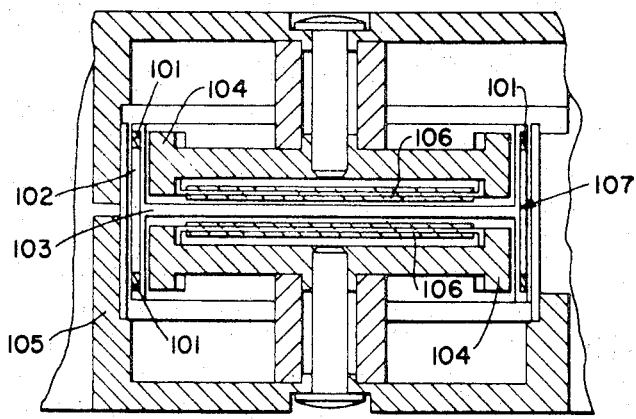
FIG. 9 is a fragmentary cross-sectional view taken along line IX—IX of FIG. 8.

It will be apparent to those skilled in the art that the basic concepts discussed previously in connection with FIGS. 1 through 7 may take any one of a vast number of differing physical forms. Two such embodiments are shown in FIGS. 8 through 11. Referring initially to FIGS. 8 and 9, the accelerometer there shown differs from that previously described in that the forcer windings 101 have been positioned within the mass ring or cylinder 102 instead of being placed on the center support disc 103. Differently shaped magnetic pole pieces 104 and flux return paths 105 are necessitated, of course, by this structure, The piezoceramic drivers 106 are positioned about the magnet in much the same manner as that described in the previous embodiment. As they vibrate, a squeeze-film is developed between their facing surfaces and disc-shaped section 103 of proof mass 107, resulting in a near frictionless levitation of the proof mass. Rebalancing of the proof mass is effected by the magnetic interaction of magnet assemblies 104 and 105 with force windings 101. A capacitive sensing assembly, similar to that described in connection with FIGS. 1 and 2, may be utilized for sensing deviations of the proof mass from its null position.

Figure 10:
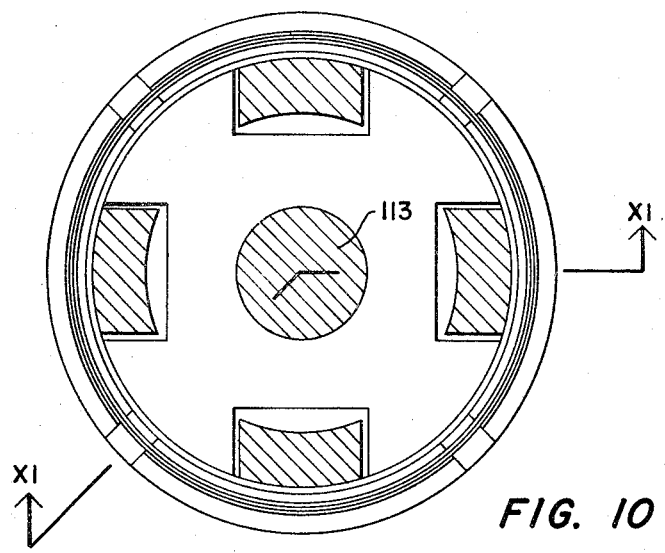
FIG. 10 is a fragmentary plan view, partially in cross-section, of a third embodiment of this invention.
Figure 11:
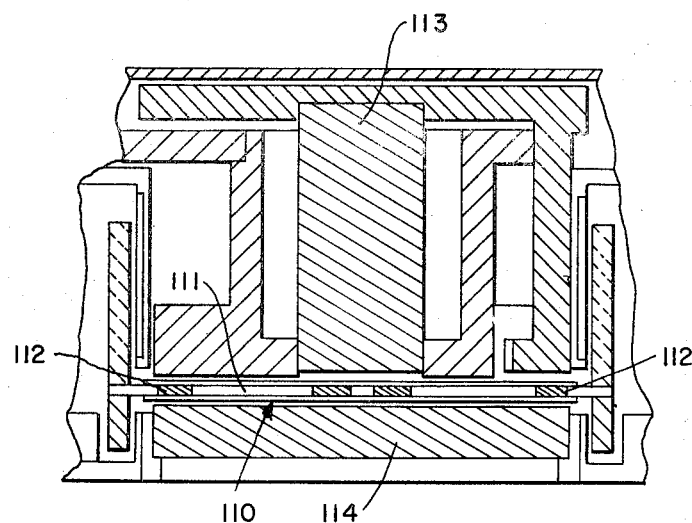
FIG. 11 is a fragmentary cross-sectional view taken along line XI—XI of FIG. 10.

In FIGS. 10 and 11, there is shown a third embodiment of this invention in which the vibrating drivers 110 are affixed to the proof mass instead of to the casing. The forcer windings 112 are located in the disc-shaped section of the proof mass 111 and the drivers affixed symmetrically thereover. In this embodiment, the piezoceramic drivers or benders move with the proof mass as external accelerations cause it to displace from its null position within the casing. Suitable pole means 113 and 114 are provided for rebalancing the proof mass in response to capacitively sensed displacements thereof. The embodiment shown in FIGS. 10 and 11 has a disadvantage of requiring an extra set of flex leads to transmit power from the casing to the piezoceramic benders 110.

While each of the embodiments of this invention has been illustrated as utilizing a capacitive pick-off, it will be appreciated readily by those skilled in the art that other types of pick-offs may be utilized. For example, deviations of the proof mass from its null position might be detected by means of a conventional light source, a collimating lense, a focal lense and a photo sensor.

While a preferred embodiment of this invention has been illustrated in detail along with two modifications thereof, it will be readily apparent to those skilled in the art that many other physical embodiments of the accelerometer may be fabricated without departing from the scope and spirit of the specification. Such other embodiments are to be deemed as included in the following claims unless these claims, by their language, expressly state otherwise.

We claim:
1. In a two-axis accelerometer having a gas filled casing and a proof mass mounted within said casing, said proof mass having a null position with respect to said casing but being free to move with respect thereto along at least two axes in response to accelerations of said casing, the improvement comprising:
   piezoelectric vibrating means positioned between said casing and said proof mass for periodically compressing gas between said proof mass and said vibrating means whereby said mass is suspended on a compressed gas film within said casing;
   means for sensing deviations of said proof mass from said null position; and
   means responsive to said sensed deviations for deriving a signal therefrom indicative of said casing's acceleration.

2. The apparatus as set forth in claim 1 which further comprises means for rebalancing said proof mass to its null position in respone to a deviation thereof, and wherein said deriving means derives said signal by measuring the current required to rebalance said proof mass.

3. The apparatus as set forth in claim 2 wherein said rebalancing means comprises:
   magnetically interactable components affixed to said proof mass and said casing, at least a section of said proof mass being electrically conductive whereby eddy current damping of the proof mass is achieved by its movement with respect to at least part of said magnetically interactable components.

4. The apparatus as set forth in claim 2 wherein said proof mass has a generally planar mid-section positioned within a generally cylindrical mass ring and wherein said rebalancing means comprises:
   permanent magnet means having a series of air gaps within which said planar mid-section is positioned;
   forcer windings positioned on said planar mid-section adapted, when energized, to interact magnetically with said permanent magnet means; and means for selectively supplying voltage to said forcer windings in response to deviations of said proof mass from its null position whereby said proof mass is rebalanced at said null position.

5. The combination as set forth in claim 4 wherein said forcer windings comprise two coordinate coils printed on said planar mid-section.

6. The combination as set forth in claim 4 wherein said vibrating means are positioned to either side of said planar mid-section and affixed to said casing whereby said mid-section and its associated mass ring are levitated by said vibrating means.

7. The apparatus as set forth in claim 2 wherein said proof mass has a generally cylindrical mass ring and wherein said sensing means comprises a cylindrical outer capacitor plate affixed to said casing generally concentric with and outside of said mass ring when said proof mass is in its null position and a cylindrical inner capacitor plate affixed to said casing generally concentric with and inside of said mass ring when said proof mass is in its null position, at least one of said inner and outer plates being segmented whereby deviations of said proof mass from its null position may be capacitively sensed and resolved into coordinate components.

8. The apparatus as set forth in claim 1 wherein said proof mass comprises a generally planar section having an upstanding circular wall extending from one side thereof and wherein said casing has a section having a generally cylindrical periphery concentric with and adapted to receive said upstanding circular wall.

9. The apparatus as set forth in claim 8 wherein said sensing means comprises means for sensing capacitance changes between sections of said proof mass and said casing.

10. A two-axis accelerometer comprising: a gas filled casing; a proof mass positioned within said casing, said proof mass being free to move with respect to said casing in any direction within a predetermined plane; piezoceramic bender means positioned between said casing and said proof mass adapted to levitate said proof mass with respect to said casing so as to form a gas bearing; means for sensing movements of said proof mass within said casing; and means responsive to said sensed movement for deriving a signal therefrom indicative of the acceleration of said casing.

11. A two-axis accelerometer comprising: a gas filled casing; upper and lower support members positioned within said casing; a proof mass having a generally disc-shaped planar mid-section and a generally cylindrical mass ring positioned therearound and extending on each side thereof, said planar mid-section being positioned between said upper and lower support members; disc-shaped vibrating means affixed to said upper and lower support members and positioned on either side of said planar mid-section whereby said proof mass will be levitated with respect to said upper and lower support members; means for sensing motion of said proof mass; and means responsive to said sensed motion for deriving a signal indicative of acceleration.

12. The combination as set forth in claim 11 which further comprises:

upper and lower permanent magnets affixed to said upper and lower support members respectively, said upper and lower magnets having upper and lower pole pieces respectively, said upper and lower pole pieces converging toward one another to form air gaps within which sections of said proof mass are positioned; and forcer windings positioned on said proof mass within said air gaps adapted to shift said proof mass with respect to said support members.

13. The combination as set forth in claim 12 wherein said upper and lower pole pieces converge toward and said windings are positioned on the generally disc-shaped mid-section of said proof mass.

References Cited

UNITED STATES PATENTS

| | | | |
|---|---|---|---|
| 3,080,761 | 3/1963 | Speen | 73—516 |
| 3,165,934 | 1/1965 | Smoll et al. | 73—516 |
| 3,212,341 | 10/1965 | Keller | 73—516 |
| 3,221,563 | 12/1965 | Wing | 73—516 |
| 3,171,696 | 3/1965 | Houghton | 308—1 |
| 3,302,466 | 2/1967 | Ogren | 73—516 |
| 3,264,861 | 8/1966 | Miles | 310—8.6 |
| 3,283,589 | 11/1966 | Ensley | 73—516 |

JAMES J. GILL, Primary Examiner

H. GOLDSTEIN, Assistant Examiner

U.S. Cl. X.R.

308—1; 310—9.1